April 23, 1940.  H. L. BLUM  2,198,103
FLUID METER
Filed March 25, 1937  4 Sheets-Sheet 1

Hosmer Louie Blum
INVENTOR.

BY Edmund W. E. Kamm

ATTORNEY.

April 23, 1940. H. L. BLUM 2,198,103
FLUID METER
Filed March 25, 1937 4 Sheets-Sheet 2

Hosmer Louie Blum
INVENTOR.
BY Edmund W. E. Kamm
ATTORNEY.

April 23, 1940.  H. L. BLUM  2,198,103

FLUID METER

Filed March 25, 1937  4 Sheets-Sheet 3

Hosmer Louie Blum
INVENTOR.

BY Edmund W. E. Kamm
ATTORNEY.

April 23, 1940.   H. L. BLUM   2,198,103
FLUID METER
Filed March 25, 1937   4 Sheets-Sheet 4

Hosmer Louie Blum
INVENTOR.

BY Edmund W. E. Kamm
ATTORNEY.

Patented Apr. 23, 1940

2,198,103

UNITED STATES PATENT OFFICE 2,198,103

FLUID METER

Hosmer Louie Blum, Fort Wayne, Ind.

Application March 25, 1937, Serial No. 132,964

7 Claims. (Cl. 73—259)

My invention relates to fluid meters, more specifically to meters for measuring and indicating the volume of liquids flowing through a dispensing line.

One of the objects of my invention is to produce a meter which is adapted to operate efficiently under conditions of low supply pressure.

Another of the objects of my invention is to produce a meter which has a relatively low head loss.

Yet another object of my invention is to produce a meter which can be cheaply manufactured.

A still further object of my invention is to provide a meter having a gyratory measuring mechanism and a rotary valve.

A further object of my invention is to provide a meter having a gyratory displacement mechanism, the gyrations of which are controllable to vary the displacement of the meter.

Another object of my invention is to provide a meter having its mechanism arranged to provide fluid passages of suitable size and arranged to permit unimpaired flow of a large volume of fluid.

Another object of my invention is to provide a meter which has few parts.

Still another object of my invention is to provide a meter having a smooth and powerful action.

A further object of my invention is to provide a meter having a gyratory member adapted to receive crossed blades which assist in defining measuring chambers which are successively constricted and enlarged by said member.

A further object of my invention is to provide a meter which has a gyratory displacement element, the orbit of which is regulated to regulate the volume of fluid discharged by the meter.

Still another object of my invention is to provide a meter in which crossed blades fitted in a gyratory member are moved laterally thereby but are prevented from pivoting by guide means.

Yet another object of my invention is to provide a meter having a gyratory member, and a rotary valve which is provided with an intake and a discharge channel.

Still a further object of my invention is to provide a meter having a gyratory member through which measured liquid is discharged.

A further object of my invention is to provide a meter in which a plurality of peripherally located measuring chambers are defined in part by crossed blades, and a gyratory member which receives portions of said blades, and by which said blades are moved laterally but are restrained from pivotal motion by guide means which permit only said lateral motion.

These and other objects will be apparent from a study of this specification taken in connection with the accompanying drawings which form a part hereof and wherein.

Figure 1:
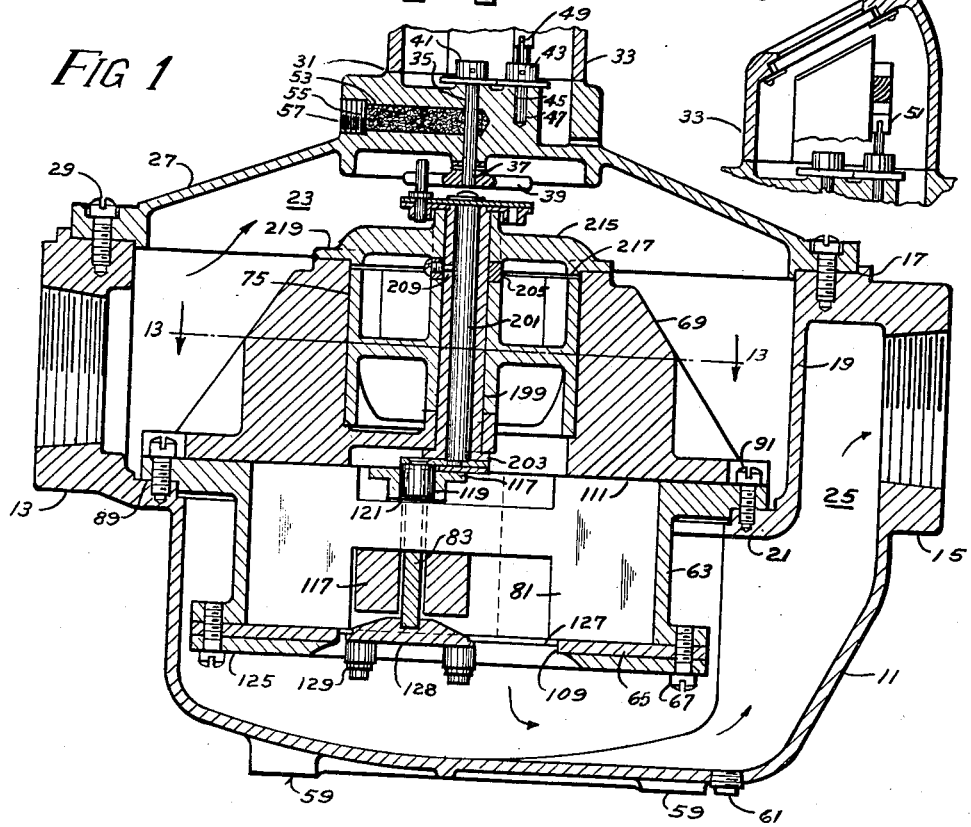
Figure 1 is an elevation partly in section of my meter, parts thereof being broken away.

Referring to Figure 1 of the drawings, 11 represents the meter bowl which is preferably of cast construction and which is provided with horizontally aligned bosses 13 and 15 and a flanged rim 17. The bosses are internally threaded to receive the inlet and outlet conduits which connect the meter respectively to a reservoir of liquid and to the receptacle into which the metered fluid is dispensed. These elements are not shown since they are conventional elements of any dispensing system. Such system may optionally include an arrangement for forcing the fluid to be measured, to the meter under pressure, as for example a pump or air or hydraulic pressure apparatus.

The bowl is provided with a vertical wall 19 which merges with the side or exterior walls of the bowl and with a horizontally disposed ring 21. The latter is arranged below the level of the openings in the bosses so that it and the wall 19 in effect, form two chambers 23 and 25, with the exterior walls of the bowl proper.

Figure 2:
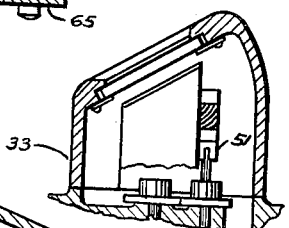
Figure 2 is an end elevation partly in section the registering mechanism which is normally attached to the meter but shown broken away in Figure 1.

A cover 27 seats on the flanged rim 17 and is held in position thereon by means of screws 29 or other fastening means. If necessary a gasket may be interposed between the rim and cover. The upper portion of the cover 27 is provided with a seat 31 upon which may be mounted the register 33 and its housing which is better shown in Figure 2. While only the comparatively simple counter type of register is shown, it should be understood that any form of recorder, indicator computer or other registering mechanism may be used in its stead.

The cover 27 is provided at 35 with a vertical bore in which is mounted the drive shaft 37. A double forked element 39 is pinned to the lower end of the drive shaft 37 while a gear 41 is pinned to the upper end thereof. A second gear 43 is mounted by means of a pin or other connection upon a shaft 45 which seats at one end in a blind hole 47 in the cover and which is connected at its other end by means of a tongue and groove connection 49 to the register shaft 51.

Plastic packing 53 is provided in a passageway 55 which lies substantially perpendicular to said shaft and through which the shaft passes. A plug 57 serves to compress the packing about the shaft to prevent leakage of fluid from chamber 23 into the counter case 33.

Mounting pads 59 may be formed on the bottom of the bowl 11 and a plug 61 is also provided in the bottom of said bowl so that it may be drained.

Figure 13:
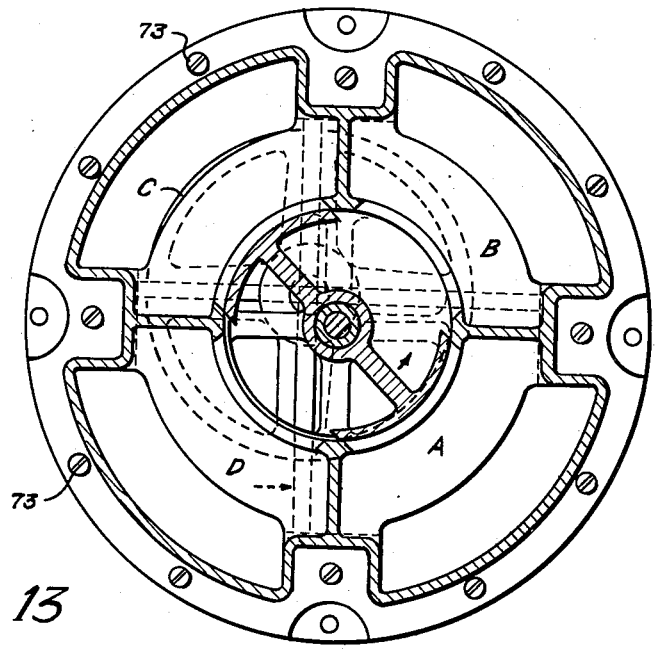
Figure 13 is a sectional view taken substantially on the line 13—13 of Figure 1 with the movable elements in the dead center position.
Figure 14:
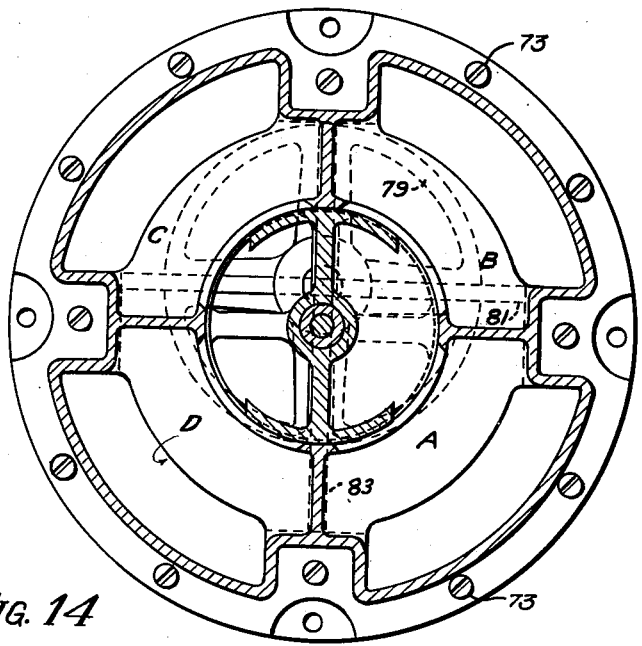
Figure 14 is a sectional view taken substantially on the line 13—13 of Figure 1 with the movable parts 45° off the dead center position.

The metering mechanism proper comprises a body member 63 having a bottom plate 65 fixed thereto by means of screws 67 and a cap member 69 which is fixed to the body member 63 by means of screws 73 (see Figures 13 and 14). The cap 69 is provided with a cylindrical bore 75 in which the valve, indicated generally by the numeral 77, is fitted.

A gyratory member 79 is mounted in the body member 63 and blades 81 and 83 are mounted in slots 85 and 87 (Figure 12) in the spokes of the gyratory member. Connection is established between the gyratory member and the valve as will be set forth in detail below. Suffice it to say at this point that the metering mechanism comprising the body, cap, valve, gyratory member and other elements necessary to their cooperation, are so connected together that the mechanism forms a unit which is supported by a flange 89 on the body member on the ring 21 which forms a part of the bowl 11 as described above. The metering mechanism is held in place on the ring by means of screws 91 and if necessary, a gasket may be interposed between ring 21 and flange 89 to provide a liquid tight joint. It will be seen that by reason of this construction any fluid passing from chamber 23 to the chamber 25 must pass through the metering mechanism and at the same time this mechanism is removable as a unit from the bowl so that it may be repaired, inspected, cleaned, etc.

Figure 12:
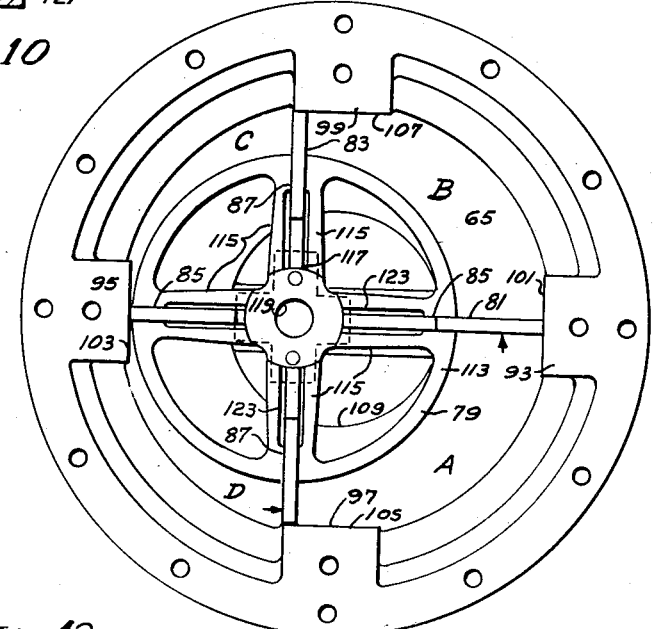
Figure 12 is a plan view of the displacement chambers and elements.

Proceeding to a more complete description of the gyratory mechanism, an inspection of Figure 12 discloses that the body member 63 is in the form of an annulus having one set of diametrically opposed pads 93 and 95 and a second set of similar pads 97 and 99 spaced 90 degrees from the first set. The pads extend inwardly and have faces 101, 103, 105, and 107 respectively which are finished and occupy planes which are perpendicular with respect to the diameters upon which they are located.

The bottom plate 65 is finished on its inwardly facing surface and is provided with a discharge opening 109 which leads into the chamber 25 described above. The lower surface 111 of the cap 69 (Figure 1) is also finished so that the gyratory member 79 will be snugly confined between and for movement with respect to two smooth surfaces so as to reduce friction.

Figure 3:
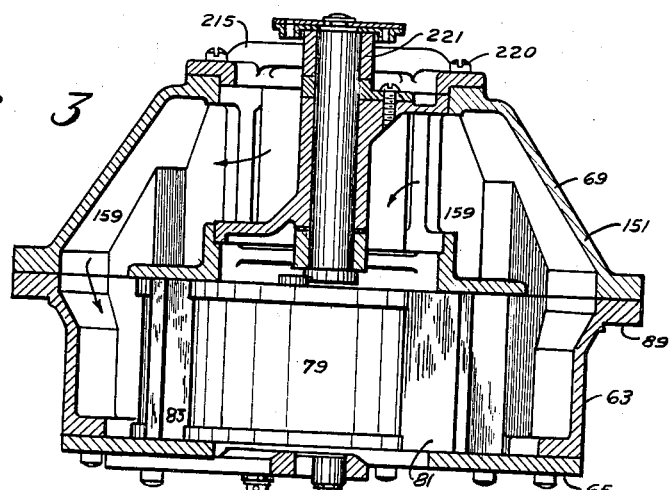
Figure 3 is an elevation partly in section of the metering mechanism of the meter shown rotated 45° about its vertical axis from the position in which it is shown in Figure 1.

The gyratory member 79 comprises an annular rim 113 which may be slightly flanged as shown in Fig. 3 having four spoke members 115 extending radially inwardly to a central hub 117 which is provided with an axial opening 119 (Figure 1) which is adapted to receive a pin 121 which is fixedly mounted on the end of a crank which will be later described. The hub 117 is provided with slots which are in alignment with the radial slots 85 and 87 in the spoke members and which are of sufficient depth to permit the entrance of the narrow portions of the blades 81 and 83 when the latter occupy their assembled relation as shown in Figure 11.

Slots 85 and 87 in the spokes of member 79 are somewhat enlarged inwardly of the periphery of the member as shown at 123 Figure 12 so as to reduce the friction area between said member and the blades.

Figure 11:
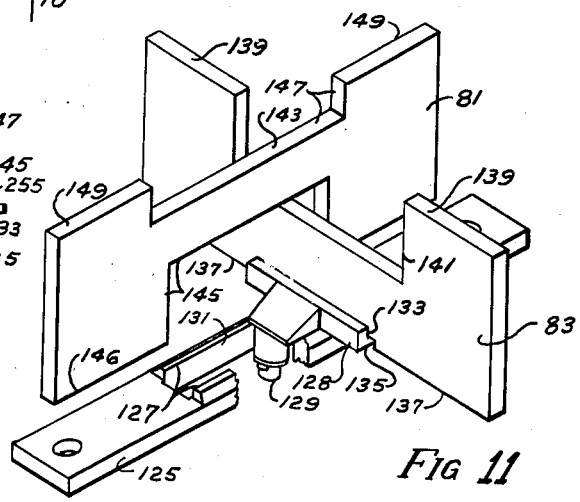
Figure 11 is a perspective view of impeller blades and their guiding mechanism.

As is clearly shown in Figure 1, a track 125 is mounted below the bottom plate 65 so as to extend diametrically across the opening 109 therein and also so as to be in line with the blade 81 as is shown in Figure 11. The track 125 is provided with raised rails 127 which are adapted to support a carriage 128 which is provided with a pair of rolls 129 which are adapted to ride in a slot 131 formed in the track midway between said rails. A groove 133 is formed in the carriage and the axis of the groove is at 90 degrees to the axis of said slot 131.

Blade 83 is notched as at 135 so that the bottom edges 137 of the blade will be free to rest upon the bottom plate 65. The upper edge 139 is notched as at 141 to receive the cross bar 143 of the other blade 81.

Blade 81 is notched at 145 so as to receive the blade 83 and so as to bring the lower edges 146 of blade 81 flush with those of blade 83 and is notched as at 147 so as to clear the hub 117. The top edges 139 and 149 of the blades lie in the same plane so that they may bear against the finished surface 111 of the cap 69 as the bottom edges bear against the finished surface of the bottom plate.

It will be seen that the gyratory member 79 and the blades 81 and 83 together with the body member 63 and its pads 93, 95, 97, and 99 cooperate to form four independent chambers A, B, C and D, Figure 12, which chambers are bounded at the top by the cap 69, the lower surface 111 of which rests upon the top edges of the blades and are bounded at the bottom by the bottom plate 65. The gyratory member, as it gyrates about the central vertical axis of the body member in a clockwise direction, as will be later described, progressively reduces and then increases the volumetric capacity of each of the chambers in succession. As the volume of the chambers is reduced, liquid is forced from them and as their volume increases unmeasured liquid flows into them. The channels by which the liquid is conducted to and from the chambers and the valve which controls the flow of fluid will now be described.

Figure 4:
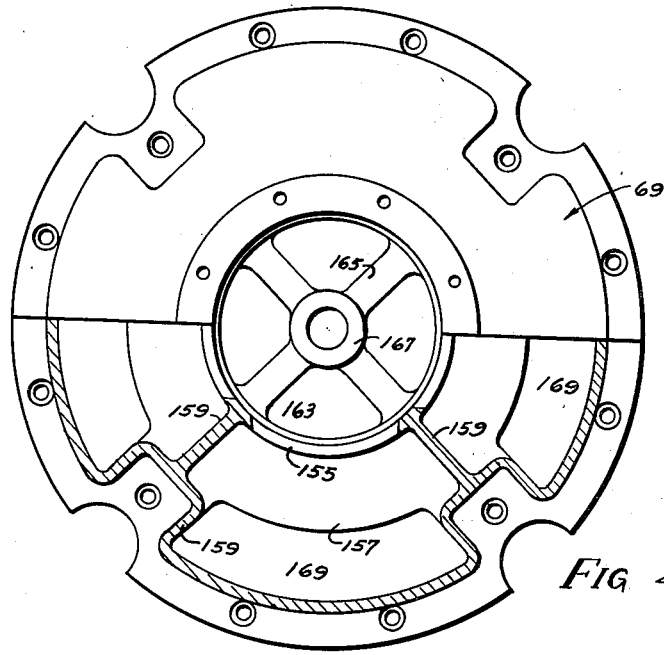
Figure 4 is a plan view of the cap of the metering mechanism shown partly in section.
Figure 5:
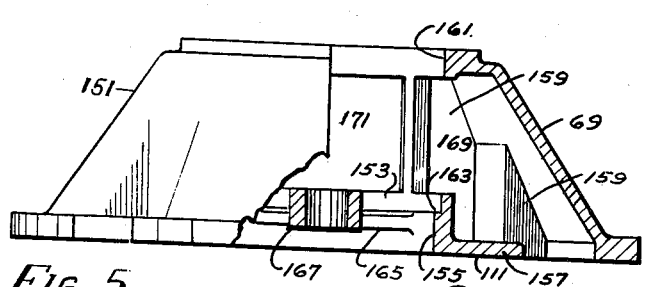
Figure 5 is an elevation of the cap of the metering mechanism shown partly in section.
Figure 9:
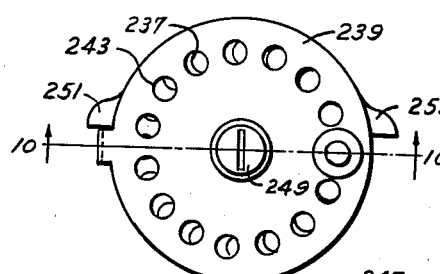
Figure 9 is a plan view of the displacement adjusting mechanism.

The cap (Figures 4 and 5) which is indicated generally by the numeral 69 comprises a frustoconical shell 151 which carries a valve supporting element 153. The latter element is made with an axially extending flange 155 and a radially extending flange 157, the lower surface of which is the finished surface 111 heretofore described. The valve supporting element is supported by webs 159 which extend radially inwardly from the shell. A counterbore 161 extends downwardly from the top of the frustum and terminates in the axial flange of the supporting element thus forming an annular shoulder 163 against which the bottom edge of the cylindrical valve 77 is adapted to rest. The inwardly extending edges of the webs are thus finished so that they will fit snugly against the periphery of the valve.

Radial arms 165 extend inwardly from the valve supporting element 153 so as to support a hub 167 which is located with its axis on the vertical axis of the shell.

The outer surfaces of flanges 155 and 157, the inner surface of the shell 151 together with the webs 159 define passageways or conduits 169 by which liquid may enter or leave the chambers A, B, C and D described above. These conduits terminate at their opposite ends in ports 171 located at the counterbore 161 so that the entrance and departure of fluid from said conduits may be controlled by the valve which is seated in said counterbore.

Figure 8:
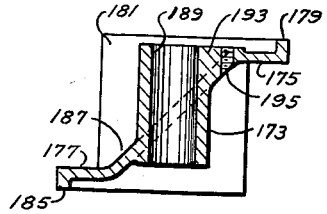
Figure 8 is a sectional view of the valve taken on the line 8—8 of Figure 7.
Figure 7:
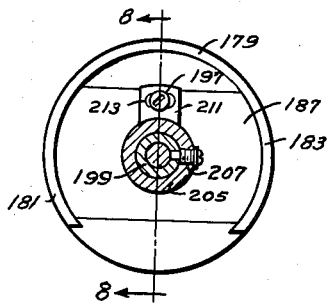
Figure 7 is a plan view of the valve showing the valve timing adjustment.
Figure 6:
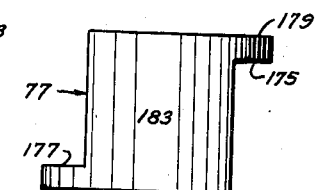
Figure 6 is an elevation of the valve.

Referring to Figures 6, 7 and 8, it will be seen that the valve, indicated generally by the numeral 77, is generally cylindrical in outline with a centrally located, axially disposed hub 173. A web 175 extends radially outwardly in one direction at one end of said hub while a similar web 177 extends from the other end of said hub in a diametrically opposite direction. Web 175 is provided with an axially upwardly extending flange 179 which merges with side walls 181 and 183 while web 177 is provided with a similar but downwardly extending flange 185. A web 187 extends diagonally between said first mentioned webs 175 and 177 so as to form two separate channels, one above and one below the webs 175, 177 and 187.

The hub 173 is provided with an axial bore 189 to receive a shaft assembly 199 while the web 187 is provided with a boss 193 which is drilled and tapped at 195 to receive a screw fastening 197.

As will be seen from a consideration of Figures 1 and 7, the hub 173 is adapted to receive a sleeve 199 which in turn receives a shaft 201. The sleeve 199 passes through the hub 167 and is provided with a flange 203.

A collar 205 having an opening of sufficient size to receive sleeve 199 is drilled and tapped to receive a pilot point screw 207. The point of this screw enters an opening 209 in the sleeve so that the collar and sleeve will move as a unit. The screw 207 and opening 209 are so located that the flange 203 of the sleeve and the hub 173 of the valve are held snugly against the lower and upper faces of hub 167, the valve being, however, free to rotate about said sleeve.

Collar 205 is provided with an arm 211 which in turn is provided with an arcuate slot 213. The slot is located in alignment with the hole 195 in the valve, and the screw 197 enters the hole through the slot so that the valve will be constrained to move with the arm 211, collar 205 and sleeve 199. The arcuate slot permits adjustment of the valve relative to the last mentioned elements so as to provide for timing of the valve.

A spider 215, having an outer axial flange 217 and a radial flange 219, is adapted to be mounted on top of the cap 69. The axial flange fits inside of the counterbore 161 while the radial flange rests on the upper extremity of shell 151 where it is held in place by screws 220 or other suitable fastenings. The spider is provided with a hub 221 which is bored to receive the sleeve 199 so as to form a bearing therefor.

The lower end of shaft 201 (Figures 1 and 10) is provided with an eccentric 223 which is adapted to engage in a transverse slot 225 in the arm 227 which carries the pin 121. The arm 227 is held in position against the lower face of flange 203 by means of a plate 229 which is held on the flange in any suitable manner and which is slotted to permit inward or outward motion of the arm 227 as the eccentric is rotated.

Sleeve 199 has a reduced portion 231 at its upper end which is flatted at one side. An adjusting disk 233 having an opening of similar contour fits snugly over the portion 231. This disk is provided with an annular flange 235, and holes 237 which are equally spaced, are formed in the disk and flange.

A disk 239 is similarly fitted to a reduced portion 241 on the upper end of the shaft 201. Equally spaced holes 243 are formed in disk 239, but of a different number than that in disk 233 so that by lining up successively the adjacent pairs of holes in the disks and inserting the shouldered pin 245, various adjustments of shaft 201 with respect to sleeve 199 may be made within the 180 degrees of rotation of the eccentric.

The pin 245 fits snugly in the holes in the disks and the projecting portion 247 thereof cooperates with the yoke 39 so as to transmit the rotation of shaft 201 to the registering mechanism. A screw 249 is screwed into the end of the shaft 201 so as to maintain the adjusting disks in position on the shaft and sleeve respectively.

Disk 233 is provided with a pair of projections 251 and 253 which are located both on one side of a diameter of the disk but facing in the same direction. The projections are adapted to cooperate with a bent over ear 255 which projects from disk 239. The projections are adapted to prevent relative rotation of the disks beyond 180 degrees by engaging said ear, thus defining the extreme positions of the eccentric 223.

It will be seen from an examination of Figures 1, 13 and 14, that the arm or crank 227 extends at substantially 90 degrees to openings leading into the upper and lower channels of the valve. The gyratory member 79 revolves about the shaft 201 and sleeve 199 as a center. It will also be seen from Figures 13 and 14, that the plan view of the valve 77 falls in the same area as parts of two or more of the openings formed by the spokes and periphery of the gyratory member which also form discharge passages leading to the opening in the bottom plate and passing through the gyratory member. The bore 161 is in axial alignment with the opening 109 in the bottom plate 65. Thus the lower chamber of the valve is always in communication with chamber 25 by way of the openings through the gyratory member and that through the bottom plate.

Operation

Figure 14 illustrates the parts in a position intermediate of dead center position. That is all of the chambers are in communication with one or the other of the valve channels. The upper portion of the valve is cut away so that the interior of the lower or discharge channel of the valve is exposed while the lower portion of the upper or intake channel of the valve is defined in the right-hand portion of the view.

Accordingly it is seen that the chambers C and D are in communication with the discharge chamber 25 of the meter while chambers A and B are in communication with the intake chamber 23. Chambers C and D are thus discharging while chambers A and B are filling, the flow of fluid from the former being by way of passages 169 and ports 171 to the discharge channel of the valve and thence downwardly through openings in the gyratory member and the opening 109 in the bottom plate into the discharge chamber 25 of the bowl while the flow of fluid to the chambers A and B is from inlet chamber 23 of the meter, through the inlet channel of the valve, ports 171 and passages 169.

Thus the inlet pressure is applied to an area which comprises the elevation area of the exposed portion of the blade 83 and the projected area of the gyratory member taken in elevation. The discharge pressure is applied to a similar area and in the opposite direction. Since the inlet pressure exceeds the discharge pressure the effective force is applied in a leftward direction (Figure 14) to cause blade 83 and the gyratory member to shift in a counter-clockwise direction since the latter is confined to movement in an orbit by the crank 227 and pin 121. The gyratory member slides with respect to the blades which are confined for motion in rectilinear paths. The blades will wipe back and forth across the surfaces of the pads 93, 95, 97 and 99 as the member 79 gyrates. During such gyration of the member, the chambers will be progressively restricted and enlarged.

An inspection of Figure 13 which depicts the gyratory member in the dead center position which follows the position shown in Figure 14. It will be seen that in this position the chamber C has been completely restricted and has completely discharged the liquid it contained and the valve has moved to a position in which it completely obstructs the port 171 which controls this chamber. Similarly the chamber A has been completely filled and its associated port 171 has been obstructed by the valve. The chambers B and D are connected with the inlet and outlet chambers of the meter respectively by entirely unobstructed ports 171.

At the next instant the chamber C is connected to the inlet port of the meter while the chamber A is connected to the outlet chamber and chambers B and D continue to fill and discharge respectively passing through the stage shown in Figure 12 until the next dead center position is reached, that is when the gyratory member occupies the lower left quadrant in which position these chambers will be respectively full and empty. Thereafter, upon slight motion of the member valve will pass the dead center position and these chambers will begin to empty and fill respectively.

This process is repeated as the gyratory member passes through successive phases of the cycle.

The adjustment 207, 211 and 213 shown in Figure 7 permits the rotation of the valve with respect to the gyratory member so that its movement may be timed with respect to the movements of the gyratory member.

Figure 10:
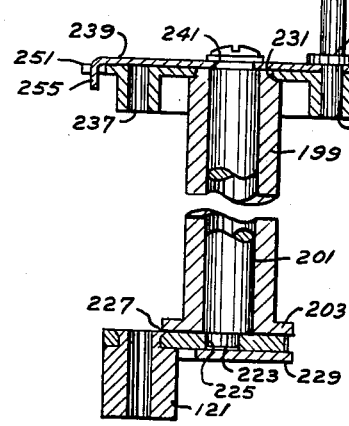
Figure 10 is a sectional view of the displacement adjusting mechanism taken on the line 10—10 of Figure 9.

The other adjustment disclosed in Figures 10 and 11, as explained above, adjusts the length of the arm 227. It will be seen from an examination of Figures 13 and 14 that the shortening of the arm would narrow the orbit of travel of the gyratory member and render the constriction and exhausting of the chambers other than complete with the obvious result that less liquid will be discharged in a cycle of operation of the gyratory member. It is in this way that the meter may be calibrated with respect to its register.

The track and carriage shown in Figure 11 serve to maintain the blade 83 perpendicular to the direction of its travel which is determined by the track. This serves to maintain the gyratory member against rotation about its axis which is pin 121, and since this is prevented the companion blade which fits in a slot in the gyratory member is prevented from moving other than perpendicular to its length. Thus cramping or binding of either blade between the pads or projections is effectively prevented.

The moving parts of the meter are made of light metals so far as this can be done without increasing resulting wearing of the parts. The weight of the gyratory member and the blades is a factor of considerable importance since these parts are reciprocating.

It is apparent that various changes may be made in the form, arrangement and construction of the mechanisms here disclosed and the parts thereof without departing from the spirit of the invention, the scope of which is defined in the appended claims. What applicant considers to be new and desires to protect by Letters Patent of the United States is:

1. In a fluid meter, the combination of an inlet chamber, a discharge chamber, means including a metering device separating said chambers, said metering device comprising a plurality of measuring chambers formed by a displacement chamber having a plurality of inwardly extending projections equally spaced about the periphery of said displacement chamber, interfitting blades disposed between diametrically opposite pairs of projections and a gyratory member having slots for receiving said blades, means for guiding said gyratory member in an orbital path about the central axis of said displacement chamber so as to successively constrict and enlarge said measuring chambers, means for preventing pivotal motion of said blades and valve means adapted to successively connect said measuring chambers alternately with said inlet and discharge chambers.

2. In a fluid meter, the combination of means forming a series of measuring chambers, said means comprising a displacement chamber having a plurality of pairs of inwardly extending projections, said projections being equally spaced about the periphery of the chamber, interfitting blades, each extending between a pair of diametrically opposed projections, and a gyratory member formed to receive portions of said blades and adapted to move with respect thereto, means for guiding said member in an orbital path about the central axis of said chamber whereby said measuring chambers are alternately constricted and expanded in succession, means for preventing pivotal motion of said blades, means forming openings centrally of the top and bottom of said displacement chamber, passages formed in said gyratory member for connecting said openings, valve means connected to move in synchronism with said gyratory member and means including said valve means adapted to connect said measuring chambers successively with said openings and one or more of said passages.

3. In a fluid meter, means comprising a displacement chamber, blades extending transversely across said chamber and each sealingly engaging opposite walls of said chamber, said blades being mounted for bodily movement laterally of the direction of their extension, a gyratory member adapted to receive said blades and forming therewith a plurality of peripheral chambers, means for guiding said member in an orbital path, whereby said peripheral chambers will be successively constricted and expanded as said member rotates, and means for varying the radius of said orbit.

4. In a fluid meter, means comprising a displacement chamber, partition members disposed transversely of said chamber, complementary notches in said members permitting them to occupy a crossed relationship, and permitting lateral motion of each with respect to the other, a track arranged in alignment with one of said members, a carriage mounted for motion in said track and having a groove adapted to carry the other of said members, a gyratory element slotted to sealingly receive said members, mounted for motion with respect thereto, and cooperating therewith to form a plurality of peripherally arranged chambers in said displacement chamber.

5. In a meter, means forming inlet and outlet chambers, means forming a plurality of peripherally disposed measuring chambers, said last named means comprising a gyratory member, discharge conduits formed therein and passing therethrough, said conduits being in constant communication with said discharge chamber, means for causing said member to move in an orbital path to successively constrict and enlarge said chambers, a rotary valve forming channels which are in constant communication with said inlet chamber and said conduits, passages controlled by said valve and in communication with said measuring chambers, said passages being arranged to successively communicate alternately with said valve channels.

6. In a fluid meter, the combination of means forming a series of measuring chambers, said means comprising a displacement chamber having a plurality of pairs of diametrically opposed blade seats disposed about the periphery thereof, interfitting blades, each extending between a pair of seats, and a gyratory member formed to receive portions of said blades and adapted to move relative to said blades, means for guiding said member in an orbital path about the central axis of said chamber whereby said measuring chambers are alternately constricted and expanded in succession, means for preventing pivotal motion of said blades, means forming openings in the top and bottom of said displacement chamber, means forming a passage in said gyratory member for connecting said openings, valve means connected to move in synchronism with said gyratory member and means including said valve means for connecting said measuring chambers successively with said openings and said passage.

7. In a meter, means including a gyratory member forming a plurality of peripherally disposed measuring chambers, a crank for confining the motion of said gyratory member to a fixed orbit, means for adjusting the length of said crank for varying the size of the orbit, said adjusting means comprising a crank supporting sleeve having a pin plate and a shaft having a pin plate and an eccentric, alignable openings in said pin plates, said sleeve and shaft being relatively adjustable angularly, a pin adapted to occupy aligned openings in said pin plates, said pin serving to retain said sleeve and shaft in adjusted position, a register, and means adapted to be driven by said pin for driving said register.

HOSMER LOUIE BLUM.